United States Patent Office 3,491,149
Patented Jan. 20, 1970

---

3,491,149
DIAMINOCYCLOHEXANE POLYOLATE ADDUCTS
Loren D. Brake, Wilmington, Del., assignor to E. I. du Pont de Nemours and Company, Wilmington, Del., a corporation of Delaware
No Drawing. Filed Apr. 10, 1967, Ser. No. 629,427
Int. Cl. C07c 87/36
U.S. Cl. 260—563          17 Claims

ABSTRACT OF THE DISCLOSURE

The polyolate reaction products of 1,2-, 1,3- or 1,4-diaminocyclohexane and organic polyols such as ethanediol, prepared by mixing the diamine with a suitable polyol and separating the adduct that forms. The polyolate reaction products are useful in the separation of the geometric isomers of 1,2-, 1,3- or 1,4-diaminocyclohexane.

BACKGROUND OF THE INVENTION

This invention relates to polyolates of 1,2-, 1,3- and 1,4-diaminocyclohexane, their preparation and use. 1,2-, 1,3- and 1,4-diaminocyclohexane, hereinafter referred to generically as DAC, and specifically as 1,2-DAC, 1,3-DAC, and 1,4-DAC, are known to exist in two geometric isomeric forms. These geometric isomers exist because of the relative configuration of the two pendant amine groups. The two geometric isomers are designated by common terminology, the cis and the trans isomers.

As is often true of geometric isomers, these isomers differ in physical properties such as melting points. In order to obtain a particularly desired property it is often necessary to separate the isomers or at least to concentrate one isomer at the expense of the other isomer.

Various techniques are known for isolating or enriching the geometric isomers of DAC. Several techniques such as countercurrent extraction, preparation and isolation of derivatives, fractional crystallization from solvents, and fractional crystallization in the absence of a solvent have been used to separate the geometric isomers and moderate isomer enrichment can be achieved by simple distillation.

Fractional crystallization of 1,2-DAC or 1,3-DAC, with or without a solvent, is disadvantageous in that the solubility of the two geometric isomers is similar and crystallization is difficult to achieve. While the trans isomer of 1,4-DAC can be separated in high purity by crystallization without a solvent, the cis isomer cannot. A high degree of concentration of one isomer may require many recrystallizations. The formation of chemical derivatives gives a more positive crystallization scheme but has the disadvantage of usually requiring at least one reaction step and one or more subsequent chemical steps to regenerate the diamine after separation. The other methods generally are either too expensive or not efficient enough for commercial use.

I have discovered that DAC coordinates with compounds which contain two or more hydroxyl groups on aliphatic carbons, to form what I call polyolates. The term polyolate as used to describe the reaction products of this invention means a polyol in association with DAC by means of coordinate covalent bonds such as is commonly known in the chemistry of hydrates. The molecule of DAC and the molecule of the polyol are coordinated in a manner similar to water of hydration, with the polyol corresponding to the water.

These polyolate reaction products are extremely useful in separating the geometric isomers of DAC. The polyolate reaction products have different solubilities one from the other and markedly different solubilities than the geometric isomers of DAC themselves. For example, using glycol as the polyol, by converting a geometric isomer fraction such as the cis isomer fraction to the corresponding glycolate in a mixture of the two geometric isomers of 1,3-DAC, a crystallization occurs which permits the separation of the cis isomer from the trans isomer. Using this method a mixture of the geometric isomers of 1,3-DAC can be reduced in cis isomer content to 1% or lower.

Additionally, the polyolate can, if desired, be decomposed back into its component parts such as glycol and cis 1,3-DAC by simply subjecting the polyolate to fractional or azeotropic distillation under either atmospheric or reduced pressure. Under these conditions the polyol will boil off at its own boiling point in a fractional distillation and the diamine at its own boiling point, or the polyol can be separated by azetropic distillation in the presence of a third component. Techniques utilizing the polyolates of this invention, provide easy, effective and inexpensive methods for separating or concentrating the isomers of DAC.

SUMMARY

In summary this invention is directed to the polyolate reaction products of 1,2-DAC, 1,3-DAC and 1,4-DAC and organic polyol compounds containing 2, 3 or 4 hydroxy groups all attached to aliphatic carbon atoms. This invention is further directed to the preparation of the polyolate reaction products and to their use in separating the stereo isomers of diaminocyclohexane.

DESCRIPTION OF THE PREFERRED EMBODIMENTS

Reactants

The 1,2-, 1,3- and 1,4-DAC starting materials can be prepared by any suitable means. A satisfactory method is described, for example, in Whitman U.S. Patent No. 2,606,925 issued Aug. 12, 1952.

Suitable polyols can be obtained commercially or can be prepared by methods well known in the art. It is believed that all organic compounds which have multiple hydroxy groups on aliphatic carbons, and which contain no constituent groups that are more reactive with DAC than the hydroxy group, will associate with DAC to form the polyolate reaction products of this invention.

Representative of the polyhydroxyl compounds which are suitable for use in forming readily separable polyolates with a geometric isomer of 1,2-, 1,3- or 1,4-DAC are those having from 2 to 15 carbon atoms and 2 to 4 hydroxy groups attached to aliphatic carbon atoms, such as the following:

1,2,3-pentanetriol;
ethylene glycol;
1,3-propanediol;
1,3-butanediol;
1,2-propanediol;
glycerol;
3-chloropropanediol-1,2;
2-methylpropanediol-1,2;
diethylene glycol (2,2'-oxydiethanol);
2-butene-1,4-diol;
2-butyne-1,4-diol;
triethylene glycol;
1,2-butanediol;
2,3-butanediol;
1,2,4-butanetriol;
1,4-butanediol;
2-methylpentanediol-2,3;
4-methylpentanediol-1,2;
1,1,1-trimethylolpropane;
3-methoxypropanediol-1,2;
2-(hydroxymethyl)-2-propyl-1,3-propanediol;

diethanolamine;
2,3-dimethyl-2,3 butanediol;
1,2-pentanediol;
1,5-pentanediol;
2,4-pentanediol;
2,3-pentanediol;
2-methyl-2,4-pentanediol;
2,2-dimethylpropanediol-1,3;
1,2,3,4-pentanetetrol;
2,5-hexanediol;
1,2,6-hexanetriol;
1,2-hexanediol;
1,2,5,6-hexanetetrol;
1,2,3,4-hexanetetrol;
2-ethyl-1,3-hexanediol;
1,6-hexanediol;
4-methylpentanediol-1,2;
3-methyl-2,4-pentanediol;
2-methylpentanediol-1,2;
2-ethyl-2-methyl-1,3-propanediol;
4-methylpentanediol-2,3;
1,2,3-tris(hydroxymethyl)propane;
1,2-cyclohexanediol;
1,3-cyclohexanediol;
1,4-cyclohexanediol;
1,2-heptanediol;
5-methylhexanediol-1,2;
1,7-heptanediol;
1,2-octanediol;
2,3-octanediol;
3,4-octanediol;
1,8-octanediol;
4,5-octanediol;
1,2,7,8-octanetetrol;
1,2-decanediol;
1,10-decanediol;
1,2-dodecanediol;
1,12-dodecanediol;
phenylethyleneglycol;
1,2-bis(hydroxymethyl)cyclohexane;
1,3-bis(hydroxymethyl)cyclohexane;
1,2,3-cyclohexane triol;
3-cyclohexene-1,1-dimethanol;
1,4-bis(hydroxymethyl)cyclohexane;
4,4'-isopropylidene dicyclohexanol;
2,2,4,4,6,6-hexamethyl-1,3,5-cyclohexanetriol;
4,4'-bis(hydroxymethyl)bicyclohexyl;
bis(hydroxymethyl)durene;
and dihydroxycyclopentenes.

It is of interest to note that polyol compounds containing one or more thiol groups in place of hydroxy groups, are suitable for use in forming separable polyolates with geometric isomers of DAC. Representative of such thiol containing compounds are 2-mercaptoethanol, trans-2-mercaptocyclohexanol, ethane-dithiol-1,2, and 3-mercapto-propanediol-1,2.

Reaction conditions

The polyolates can be prepared by simply mixing DAC with one of the previously described polyols in a suitable vessel.

The reaction is mildly exothermic and reaction temperatures are not critical. If the reaction is conducted at atmospheric pressure, it is desirable to maintain a temperature above the freezing point of the reactants and below their normal boiling points. To avoid necessity for costly equipment the reaction will preferably be carried out between about −25° C. and 100° C., and for ease of handleability the reaction will most preferably be conducted between 15° and 75° C.

The amount of polyol used is not critical but will be determined by the results sought to be obtained. Ordinarily one mole of polyol will be used for each mole of DAC with which reaction is desired. For example, if a mixture of the two isomers is to be separated with a polyol by forming a polyolate of the cis isomer of 1,3-DAC, the polyol will be used in amounts sufficient to combine with the cis isomer only.

Amounts of polyol in excess of stoichiometric ordinarily create no problem other than separation of the polyolates and removal of the excess polyol at the completion of the reaction. Amounts which are less than stoichiometric merely result in some unpolyolated DAC isomer remaining after completion of the reaction.

When a mixture of given DAC geometric isomers is used the polyol will ordinarily combine, on a preferential basis, for example with 1,3-DAC first with the cis isomer and second with the trans isomer whereas with 1,4-DAC first with the trans isomer and second with the cis isomer. If a mixture of the isomer polyolates is formed they will ordinarily crystallize in the same order, with first reacting isomer polyolate crystallizing first and then the other isomer polyolate.

The crystallization of the polyolates can be accomplished by methods well known in the art, with simple cooling, agitation, or seeding being used as desirable.

Separation of the crystallized polyolate can also be accomplished by methods well known in the art, such as filtration, centrifugation, or decantation.

It is preferred to conduct the reaction in the presence of an inert organic solvent. Thus, for example, it appears that some of the cis isomer polyolate of 1,3-DAC, which is formed during the reaction, is dissolved in the unreacted 1,3-DAC. Addition of an inert organic solvent can be used to advantage by decreasing the solubility of the isomer polyolate in the unreacted DAC and by facilitating recovery of the isomer polyolate as well as the unreacted isomer or its polyolate.

If a solvent is used, it can be admixed with the reactants in any order. The amount and type of solvent used will be determined in part by the polyol and resultant polyolate and can range from trace amounts up to many times the volume of the reactants. For reasons of convenience and economy, the solvent will normally be used in amounts ranging from 1 to 20 times the volume of the DAC used, with the optimum recoveries obtainable at amounts of about 3 to 10 times the volume of DAC used.

In view of its purpose, the solvent should be selected on the basis that the reactants dissolve in it while one DAC isomer polyolate reaction product is readily separable from it such as by crystallization of the polyolate followed by filtration, centrifugation or decantation. It is also desirable that the solvent be one in which the DAC isomer or its polyolate, not being separated, is soluble, and which can be removed after separation by distillation or evaporation.

As will be obvious to one skilled in the art, the solvent must also be nonreactive with the starting materials and the reaction product. For example, such classes of compounds as organic acids and organics containing active halogens are not considered "inert" organic solvents for the purposes of this invention. Classes of compounds which are suitable for use as inert solvents include ethers, aromatic hydrocarbons, straight and branch-chained aliphatic hydrocarbons, substituted amines, nitriles, ketals, aliphatic and aromatic amines, stable chlorine containing hydrocarbons, and stable fluorinated aromatics. Mixtures of such inert solvents can also be used if desired.

One skilled in the art will recognize that, as mentioned above, the choice of a particular solvent is in part a function of the polyol to be used. And, while general rules regarding the solubility of like materials in like solvents and the converse exist, no perfect theoretical criteria for the optimum choice of solvents in crystallization have as yet been devised. As a result, it is generally recognized that the choice of an optimum solvent is always a matter of trial and error experimentation and much the same is true of the inert organic solvents to be used in this invention.

Solvents which have been found useful are those such as diethyl ether, di-n-butyl ether, diisopropyl ether, toluene, di-n-propyl ether, diallyl ether, benzene, xylene, n-hexane and cyclooctane.

Of these solvents, diethyl ether, di-n-butyl ether, toluene, xylene, and di-n-propyl ether are preferred because of the marked improvement their presence contributes to the crystallization of the polyolates.

The most preferred solvents because of the ease of handleability and highest polyolate recoveries are diethyl ether, di-n-butyl ether, xylene, and toluene.

Generally speaking, the selection of the polyol to be used in forming the polyolate reaction product of this invention is subject to the same considerations as the selection of a solvent. As previously mentioned, the polyol should contain no substituent groups which are more reactive with DAC than are the hydroxy groups. The polyol is chosen also on the basis of the melting point and crystal habit of the polyolate it will form.

The melting point and crystal habit of the polyolate to a large measure determine the ease and effectiveness of recovery of that polyolate by crystallization and filtration, centrifugation, or decantation.

Generally cyclohexanedimethanol and ethylene glycol are preferred polyols because the solubilities of their polyolates in either the remaining unpolyolated DAC or the remaining unpolyolated DAC plus the solvent if used, is low, and their crystal habit is such as to give a firm, more easily filterable crystal.

The most preferred polyol is cyclohexanedimethanol. Cyclohexanedimethanol converts one isomer of 1,2-, 1,3- and 1,4-DAC to the insoluble polyolate in the highest yields and the polyolate crystallizes most readily and is most easily separated from the reaction mixture.

Reaction products

As has been stated previously, the exact formation and chemical structure of the polyolate reaction products of this invention are not completely understood. However, that the reaction products exist as new chemical entities, distinct from the reactants, can be demonstrated.

For example, I have found that whereas ethylene glycol is a liquid at room temperature and the cis geometric isomer of 1,3-DAC is a liquid, an equal molar combination of these two compounds melts at 56–57° C. The melting point is sharp and distinct as is characteristic of a chemical entity. The presence of more than a stoichiometric amount of glycol or cis DAC in the preparation of this polyolate results in a melting point lowering as would be expected of a mixture of two organic compounds. Similar melting point differences can be shown in the formation of the cis 1,3-DAC-cyclohexane-dimethanolate which melts at 125–127° C., and trans 1,4-DAC-ethyleneglycolate melting at about 85° C.

Moreover, the polyolates of DAC are further demonstrated to be molecular entities through their Nuclear Magnetic Resonance spectra. The NMR indicates the formation of coordinate covalent bonding through the hydroxy group as previously described, similar to the formation of hydrates.

X-ray examination of the polyolate crystals reflect the following strongest peaks in their crystal diffraction pattern in descending order:

cis 1,3-DAC-ethanediolate: 4.95A; 4.11A; 3.74A; 4.41A.
cis 1,3-DAC-trans 1,4-cyclohexanedimethanolate: 6.06A; 4.49A; 2.54A; 2.44A.
trans 1,4-DAC-ethanediolate: 4.29A; 3.42A; 2.16A; 4.47A.
trans 1,4 - DAC - trans 1,4 - cyclohexanedimethanolate: 5.06A; 2.32A; 4.53A; 4.79A.

These examples as well as those that follow are for the purpose of exemplifying the invention and should not be construed as in any way limiting of the invention. Parts and percentages recited in the examples are by weight unless otherwise noted.

EXAMPLE 1

In a suitable vessel equipped for heating, cooling and stirring are placed 1000 parts toluene, 21 parts trans 1,4-cyclohexanedimethanol and 80 parts 1,3-DAC consisting of 51.9% cis and 48.1% trans isomers. The mixture is heated with stirring until homogeneous and is then cooled slowly to 25° C. The crystal phase is separated by filtration, washed with 50 parts of toluene and nitrogen dried. Distillation of the 31 parts of solid glycolate under reduced pressure yields 9 parts of 100% cis 1,3-DAC.

EXAMPLE 2

The mother liquor from Example 1 and 21 parts trans-1,4-cyclohexanedimethanol are heated with stirring in a suitable container till homogeneous and is then cooled slowly to 25° C. The solid phase is separated by filtration, washed with 50 parts of toluene and nitrogen dried. The 35 parts of solid glycolate recovered contain 1,3-DAC consisting of 98.2% cis and 1.8% trans isomers. The liquid phase contains 1,3-DAC consisting of 24.0% cis and 76% trans isomers.

EXAMPLE 3

The mother liquor from Example 2 and 21 parts trans-1,4-cyclohexanedimethanol are treated as in Example 2. The recovered solid phase analyzes 92.0% cis and 8.0% trans isomers. Distillation of the solid phase yields 10 parts of 1,3-DAC. The 1,3-DAC in the liquid phase consists of 1.4% cis and 98.6% trans isomers.

EXAMPLE 4

The mother liquor from Example 3 and 21 parts trans-1,4-cyclohexanedimethanol are heated as in Example 2. The resulting solution is cooled to 0–5° C. with stirring. The liquid phase is separated from the solid phase by decantation and is then washed twice with 50 parts of toluene. The 1,3-DAC remaining in the liquid phase analyzes as 100% trans isomer. The diamine in the solid glycolate consists of 1.7% cis and 98.3% trans 1,3-DAC.

EXAMPLE 5

In a suitable vessel equipped with an agitator are placed 300 parts of benzene and 50 parts of 1,3-DAC consisting of about 33.1% trans and 66.9% cis isomers. At about 60° C. and with agitation, 28 parts of 1,4-cyclohexanedimethanol is added and the mixture is cooled to 15° C. The crystalline solids obtained are separated from the mother liquor by simple filtration and are washed with benzene. The solid phase is distilled to recover 13 parts of 1,3-DAC, composed of 2% trans and 98% cis isomers. The filtrate likewise is distilled to remove the benzene and to recover 35 parts of 1,3-DAC containing 44.0% trans and 56.0% cis isomers.

EXAMPLE 6

In a container equipped for heating or cooling and stirring the contents are placed 200 parts of benzene and 50 parts of 1,3-DAC consisting of 33.1% trans, and 66.9% cis isomers. With stirring and at a temperature of 50° C., 13 parts of ethylene glycol are added, and the mixture is then cooled slowly to 25° C. The well defined crystals are removed by filtration and the crystals washed with benzene. The crystal crop contains 15 parts of 1,3-DAC containing 1.5% trans, 98.5% cis isomer. The mother liquor was found to contain 34 parts of 1,3-DAC consisting of 49.4% trans and 50.6% cis isomer.

Example 6 is repeated 3 times using in turn, 18 parts of 1,4-butanediol; 23 parts of 1,6-hexandiol; and 20 parts of dihydroxycyclopentene, in place of the ethylene glycol, and similar results are obtained.

EXAMPLE 7

In a suitable container equipped for mixing of the contents, are placed 150 parts of 1,2-dimethoxyethane and 50 parts of 1,3-DAC consisting of 33.1% trans and 66.9% cis isomers. While stirring, 15 parts of 1,2-propanediol is added and the mixture heated to 50° C. The mixture is then cooled over a period of 30 minutes to 0° C. and the solid phase is separated from the liquids by a simple filtration. The crystal crop is found to consist of 14 parts of 1,3-DAC containing 99.5% of the cis isomer.

EXAMPLE 8

With efficient stirring, 22 parts of 3-chloropropanediol-1,2 is added to a 45° C. solution of 200 parts of 1,2-dimethoxyethane and 50 parts of 1,3-DAC containing 33.1% trans and 66.9% cis isomers. The reactants are cooled to −20° C. and the resulting crystalline slurry is filtered and washed with cold 1,2-dimethoxyethane. The crystal cake is found to contain 99.0% of the cis isomer of 1,3-DAC.

EXAMPLE 9

In a suitable vessel are placed 500 parts of toluene and 50 parts of 1,3-DAC containing about 33.1% trans and 66.9% cis isomers. To this is added 23 parts of 1,6-hexanediol, which is admixed by simple swirling of the vessel contents at about 45° C. The mixture is cooled to about 20° C. and allowed to stand for one hour while crystals form. After simple filtration, the crystals are found to contain 1,3-DAC analyzing 97.0% of the cis isomer. The mother liquor contains 28 parts of 1,3-DAC consisting of 57.7% trans and 42.3% cis isomer.

EXAMPLE 10

Approximately 13 parts of ethylene glycol is added to a 40° C. mixture of 250 parts of toluene and 50 parts of 1,3-DAC containing 33.1% trans and 66.9% cis isomers. The resulting mixture is heated to boiling and then allowed to cool slowly over a period of one hour to a temperature of 25° C. The crystal crop is separated by filtration and found to contain 22 parts of 1,3-DAC consisting of 4% trans and 96% cis isomers. The mother liquor is found to contain 26 parts of diamine consisting of 66.7% trans and 36.3% cis isomers.

Repeating this example with the substitution of 1,2-DAC for the 1,3-DAC results in a separation similar to that obtained for 1,3-DAC.

EXAMPLE 11

In a suitable container equipped for stirring the contents is placed a mixture comprising 200 parts of dibutyl ether and 50 parts of 1,3-DAC containing 33.1% trans and 66.9% cis isomers. To this mixture is added 23 parts of 2,5-hexanediol. The resulting mixture is heated to 75° C. and then cooled to 20° C. The crystals which form are separated by filtration and found to contain 21 parts of 1,3-DAC. The mother liquor contains 28 parts of 1,3-DAC consisting of 56.9% trans and 53.1% cis isomers.

EXAMPLE 12

To a mixture of 200 parts of xylene and 50 parts of 1,4-DAC consisting of 64.5% trans and 35.5% cis isomers, is added 23 parts of 2-methyl-2,4-pentanediol at about 60° C. with stirring. The mixture is then cooled to 15° C. in about 35 minutes. The resulting slurry is filtered and the cake rinsed with 30 parts of xylene. The crystal cake contains 26 parts of 1,4-DAC consisting of 100% of the trans isomer. The filtrate contains 24 parts of 1,4-DAC consisting of 27.7% trans and 72.3% cis isomer.

EXAMPLE 13

A mixture of 20 parts diethyl ether, 50 parts of 1,4-DAC consisting of 64.5% trans and 35.5% cis isomers, and 21 parts of 2,2′-oxydiethanol is cooled slowly with stirring to −25° C. The crystals which form are recovered by filtration followed by a wash with cold diethyl ether. The crystal phase contains 30 parts of diamine analyzing 100% of the trans isomer. The filtrate contains 22 parts of 1,4-DAC consisting of 17.3% trans and 82.7% cis isomers.

EXAMPLE 14

At a temperature of about 45° C. and with efficient stirring, 29 parts of 2-(hydroxymethyl)-2-propyl-1,3-propanediol is added to a mixture of 150 parts of o-dichlorobenzene and 50 parts of 1,4-DAC comprised of 64.5% trans and 35.5% cis isomers. The mixture is cooled to −25° C. and held at this temperature for 10 minutes before separation of the fine crystalline solids by filtration. The crystal phase contains 22 parts of 1,4-DAC consisting of 96.4% trans and 3.6% cis isomers. The filtrate contains 29 parts of 1,4-DAC comprising 40.5% trans and 59.5% cis isomers.

EXAMPLE 15

With efficient stirring, 7 parts of 2-methyl-2,4-pentanediol is added to a 50° C. solution of 400 parts of naphtha and 50 parts of 1,4-DAC consisting of 23.3% trans and 76.7% cis isomer. The reactants are cooled to about 15° C. and the resulting crystalline slurry separated by filtration. The filtrate contains 25 parts of 1,4-DAC consisting of 11.1% trans and 88.9% cis isomer.

EXAMPLE 16

In a container equipped for heating or cooling and arranged for stirring of the contents, are placed 400 parts of butyl ether and 50 parts of 1,4-DAC consisting of 68.2% trans and 31.8% cis isomer. With stirring and at a temperature of 70° C. 23 parts of 2,3-dimethyl-2,3-butanediol is added slowly, and the mixture is then cooled to 15° C. The well defined crystals are removed by filtration and are found to contain 15 parts of 1,4-DAC consisting of 99.5% of the trans isomer. The filtrate contains 35 parts of 1,4-DAC consisting of 49.7% trans and 50.3% cis isomer.

EXAMPLE 17

Under the conditions described in Example 16, using 50 parts 1,2-DAC and 22 parts of treithylene glycol in place of 1,4-DAC and 2,3-dimethyl-2,3-butanediol, a separation of the isomers of 1,2-DAC is obtained similar to the separation of 1,4-DAC isomers in Example 16.

I claim:
1. A diaminocyclohexane polyolate adduct prepared by mixing at a temperature between −25° C. and +100° C. (i) diaminocyclohexane with (ii) a polyol having (a) from 2 to 15 carbon atoms and (b) from 2 to 4 hydroxy groups attached to aliphatic carbon atoms.

2. The polyolate of claim 1 wherein the polyol is ethylene glycol or cyclohexanedimethanol.

3. The polyolate of claim 2 wherein the diaminocyclohexane is 1,2-diaminocyclohexane.

4. The polyolate of claim 2 wherein the diaminocyclohexane is 1,3-diaminocyclohexane.

5. The polyolate of claim 2 wherein the diaminocyclohexane is 1,4-diaminocyclohexane.

6. The polyolate of claim 1 wherein the diaminocyclohexane is selected from (1) cis-1,2-diaminocyclohexane, (2) cis-1,3-diaminocyclohexane, or (3) cis-1,4-diaminocyclohexane.

7. The polyolate of claim 6 wherein the polyol is ethylene glycol or cyclohexanedimethanol.

8. The polyolate of claim 7 wherein the polyol is ethylene glycol and the diaminocyclohexane is cis-1,3-diaminocyclohexane.

9. The polyolate of claim 7 wherein the polyol is cyclohexanedimethanol and the diaminocyclohexane is cis-1,3-diaminocyclohexane.

10. The polyolate of claim 1 wherein the diaminocyclohexane is selected from (1) trans-1,2-diaminocyclohexane, (2) trans-1,3-diaminocyclohexane, or (3) trans-1,4-diaminocyclohexane.

11. The polyolate of claim 10 wherein the polyol is ethylene glycol or cyclohexanedimethanol.

12. The polyolate of claim 10 wherein the polyol is ethylene glycol and the diaminocyclohexane is trans-1,3-diaminocyclohexane.

13. The polyolate of claim 10 wherein the polyol is cyclohexanedimethanol and the diaminocyclohexane is trans-1,3-diaminocyclohexane.

14. A process for preparing a diaminocyclohexane polyolate adduct comprising:
(A) preparing two phases by mixing at a temperature between −25° C. and 100° C. (i) diaminocyclohexane with (ii) a polyol having (a) from 2 to 15 carbon atoms and (b) from 2 to 4 hydroxy groups attached to aliphatic carbon atoms and
(B) separating by physical means the two phases which result from step (A).

15. The process of claim 14 wherein an inert organic solvent is used, said solvent being one (I) in which the diaminocyclohexane and polyol are soluble and (II) from which the polyolate is readily separable.

16. The process of claim 15 wherein the solvent is diethyl ether; di-n-propyl ether; di-n-butyl ether; xylene; or toluene.

17. The process of claim 16 wherein the polyol is ethylene glycol or cyclohexanedimethanol.

References Cited

UNITED STATES PATENTS 2,606,925  8/1952  Whitman _____ 260—563

CHARLES B. PARKER, Primary Examiner

CHARLES F. WARREN, Assistant Examiner